United States Patent
Reddy et al.

(10) Patent No.: US 10,577,535 B2
(45) Date of Patent: Mar. 3, 2020

(54) SUBSTANTIALLY SOLID ACIDIZING COMPOSITION FOR TREATMENT OF SUBTERRANEAN FORMATIONS

(71) Applicant: Halliburton Energy Services, Inc., Houston, TX (US)

(72) Inventors: Baireddy Raghava Reddy, The Woodlands, TX (US); Enrique Antonio Reyes, Tomball, TX (US); Alyssa Lynn Smith, Humble, TX (US); Aaron M Beuterbaugh, Spring, TX (US); Drew Henry Gaugler, Lemmon, SD (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/034,711

(22) PCT Filed: Feb. 20, 2014

(86) PCT No.: PCT/US2014/017348
§ 371 (c)(1),
(2) Date: May 5, 2016

(87) PCT Pub. No.: WO2015/126397
PCT Pub. Date: Aug. 27, 2015

(65) Prior Publication Data
US 2016/0272879 A1    Sep. 22, 2016

(51) Int. Cl.
*C09K 8/74*    (2006.01)
*C09K 8/72*    (2006.01)
*C09K 8/52*    (2006.01)

(52) U.S. Cl.
CPC .......... *C09K 8/74* (2013.01); *C09K 8/52* (2013.01); *C09K 8/72* (2013.01); *C09K 8/725* (2013.01)

(58) Field of Classification Search
CPC . C09K 8/52; C09K 8/72; C09K 8/725; C09K 8/74; E21B 43/16; E21B 43/25
See application file for complete search history.

(56) References Cited

U.S. PATENT DOCUMENTS

| 4,466,893 A | 8/1984 | Dill |
| 5,979,556 A * | 11/1999 | Gallup .............. C09K 8/72 166/275 |

(Continued)

OTHER PUBLICATIONS

Liu, X., et al., "Acid Fracturing Technique for Carbonate Reservoirs Using Nitric Acid Powder", Journal of Canadian Petrolium Technology, 44(6), Zhao, (2005), 46-52.

(Continued)

*Primary Examiner* — Frances Tischler
(74) *Attorney, Agent, or Firm* — Chamberlain Hrdlicka

(57) ABSTRACT

Various embodiments disclosed relate to compositions for treatment of a subterranean formation, and methods and systems including the same. In various embodiments, the present invention provides a method of treating a subterranean formation that can include obtaining or providing a substantially solid composition. The substantially solid composition can include a hydrogen fluoride precursor salt and an amide hydrochloride salt. The method includes combining the substantially solid composition with a carrier fluid to form a mixture. The method includes placing the mixture in a subterranean formation downhole.

14 Claims, 5 Drawing Sheets

(56) References Cited

U.S. PATENT DOCUMENTS

| | | | |
|---|---|---|---|
| 7,192,908 B2 | 3/2007 | Frenier et al. | |
| 7,753,123 B2 | 7/2010 | Fuller | |
| 8,580,047 B1 | 11/2013 | MacDonald | |
| 2009/0233819 A1* | 9/2009 | Fuller | C09K 8/74 507/224 |
| 2015/0315712 A1* | 11/2015 | Hawes | C11D 3/046 510/257 |

OTHER PUBLICATIONS

Ghosh, Anindya, et al., "Catalase-Peroxidase Activity of Iron(III)-TAML Activators of Hydrogen Peroxide", J. Collins. Journal of the American Chemical Society, 2008 130 (45), 15116-15126.

Beach, Evan S., et al., "Activation of Hydrogen Peroxide by an Fe-TAML Complex in Strongly Alkaline Aqueous Solution: Homogeneous Oxidation Catalysis with Industrial Significance", Industrial & Engineering Chemistry Research 2009 48 (15), 7072-7076 3.

Popescu, Delia-Laura, et al., "Mechanistically Inspired Design of FeIII-TAML Peroxide-Activating Catalysts", Journal of the American Chemical Society 2008 130 (37), 12260-12261.

* cited by examiner

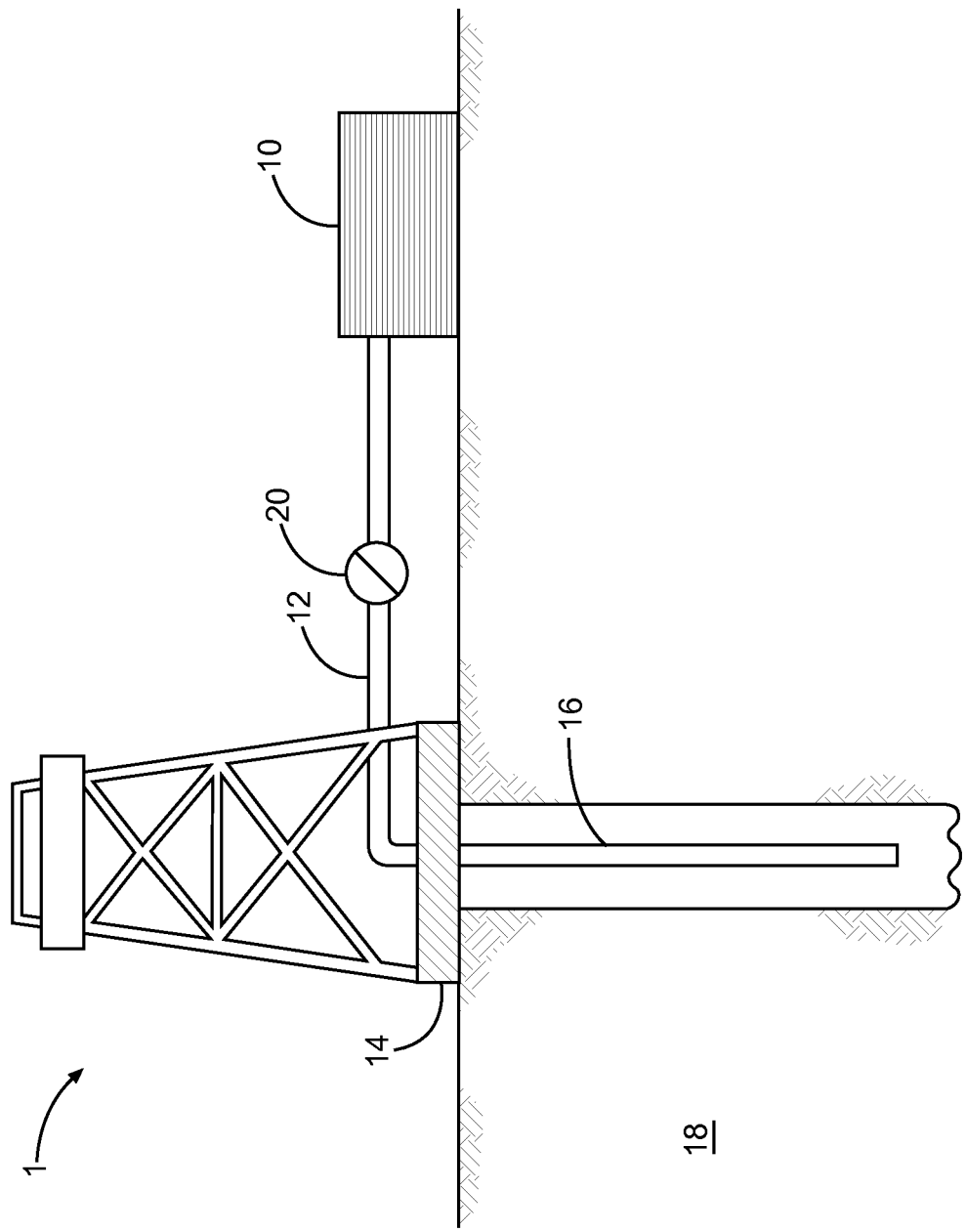

US 10,577,535 B2

SUBSTANTIALLY SOLID ACIDIZING COMPOSITION FOR TREATMENT OF SUBTERRANEAN FORMATIONS

PRIORITY APPLICATIONS

This application is a U.S. National Stage Filing under 35 U.S.C. 371 from International Application No. PCT/US2014/017348, filed on Feb. 20, 2014, and published as WO 2015/126397 A1 on Aug. 27, 2015, which application and publication are incorporated herein by reference in their entirety.

BACKGROUND OF THE INVENTION

Acid stimulation of subterranean formations can be a useful way to increase the production or introduction of fluids. However, placement of acidic materials in subterranean formations can involve expensive transportation and handling of dangerous liquids, dissolution of and damage to unintended areas of the subterranean formation, and damage to tubulars and other equipment.

BRIEF DESCRIPTION OF THE FIGURES

The drawings illustrate generally, by way of example, but not by way of limitation, various embodiments discussed in the present document.

FIG. 1 illustrates a system or apparatus for delivering a composition downhole, in accordance with various embodiments.

DETAILED DESCRIPTION OF THE INVENTION

Figure 2A:
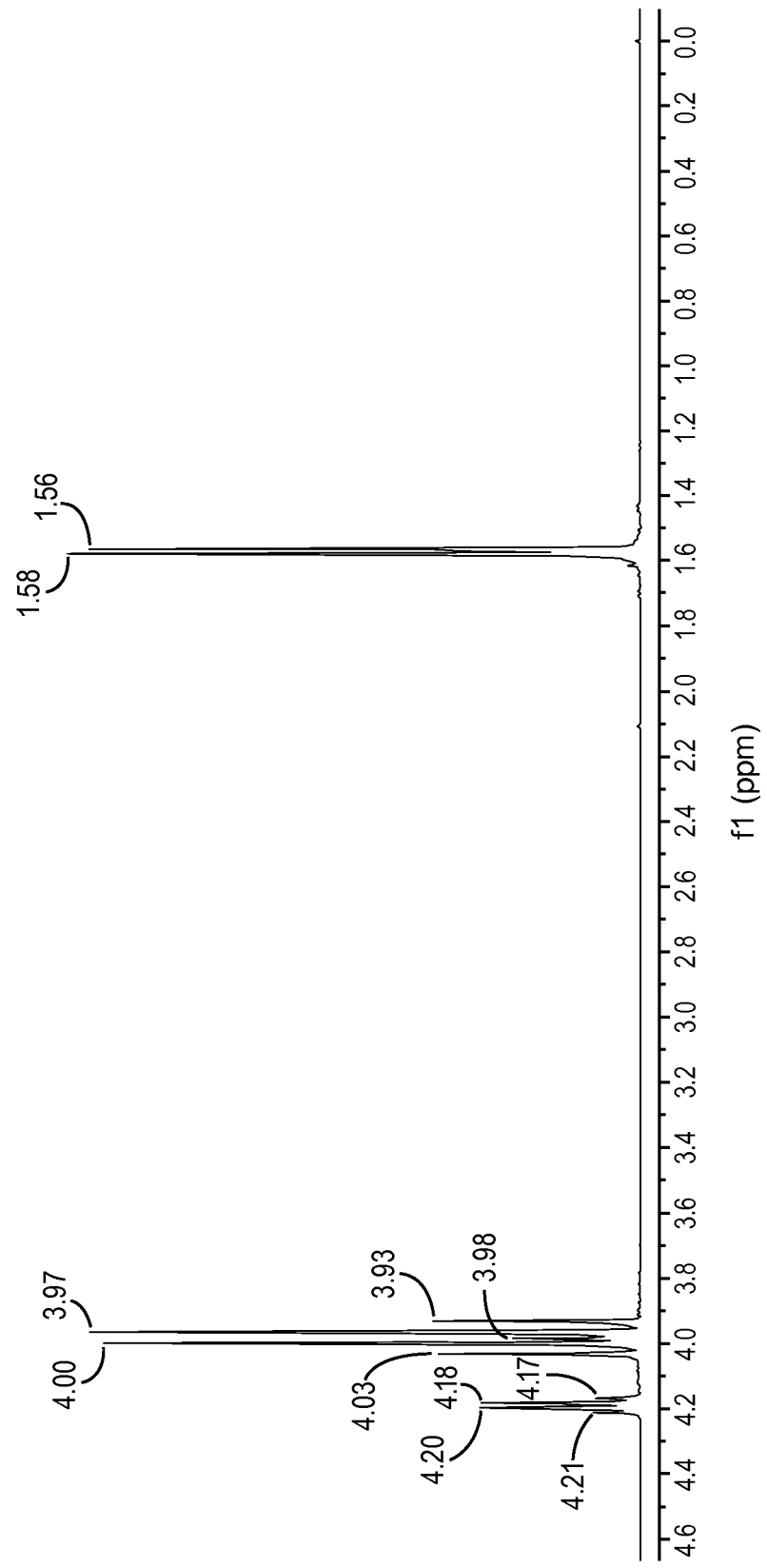
FIGS. 2a and 2b illustrate high field and low field regions, respectively, of an $^1$H NMR spectrum of U-TMP from Example 1, taken in $D_2O$, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C (O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R) N(R)C(O)R, N(R)N(R)C(O)OR, N(R)N(R)CON(R)$_2$, N(R) SO$_2$R, N(R)SO$_2$N(R)$_2$, N(R)C(O)OR, N(R)C(O)R, N(R)C (S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R)$_2$, SR, SOR, SO$_2$R', SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N (R)C(O)R, (CH$_2$)$_{0-2}$N(R)N(R)$_2$, N(R)N(R)C(O)R, N(R)N (R)C(O)OR, N(R)N(R)CON(R)$_2$, N(R)SO$_2$R, N(R)SO$_2$N (R)$_2$, N(R)C(O)OR, N(R)C(O)R, N(R)C(S)R, N(R)C(O)N (R)$_2$, N(R)C(S)N(R)$_2$, N(COR)COR, N(OR)R, C(=NH)N (R)$_2$, C(O)N(OR)R, or C(=NOR)R wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH (CH$_3$), —CH=C(CH$_3$)$_2$, —C(CH$_3$)=CH$_2$, —C(CH$_3$) =CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "amine" as used herein refers to primary, secondary, and tertiary amines having, e.g., the formula N (group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

As used herein, the term "polymer" refers to a molecule having at least one repeating unit and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packing fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

In various embodiments, the present invention provides a method of treating a subterranean formation. The method includes obtaining or providing a substantially solid composition. The substantially solid composition includes a hydrogen fluoride precursor salt and an amide hydrochloride salt. The method includes combining the substantially solid composition with a carrier fluid to form a mixture. The method also includes placing the mixture in a subterranean formation downhole.

In various embodiments, the present invention provides a method of treating a subterranean formation. The method includes providing a substantially solid composition including about 0.001 wt % to about 50 wt % ammonium bifluoride, about 20 wt % to about 99 wt % urea hydrochloride, and about 5 wt % to about 60 wt % of a chelating agent that is at least one chosen from polyaspartic acid, methylglycine diacetic acid (MGDA), iminodisuccinic acid (IDS), hydroxyethylene iminodisuccinic acid (HIDS), hydroxyethylethylenediaminetriacetic acid (HEDTA), and glutamic acid diacetic acid (GLDA). The method includes combining the composition with a carrier fluid to form a mixture. The method also includes placing the mixture in a subterranean formation downhole, wherein the combining occurs at least one of before, during, and after placing the mixture in the subterranean formation.

In various embodiments, the present invention provides a system. The system includes a substantially solid composition including a hydrogen fluoride precursor salt and an amide hydrochloride salt. The system also includes a subterranean formation including the composition therein.

In various embodiments, the present invention provides a composition for treatment of a subterranean formation. The composition includes a hydrogen fluoride precursor salt and an amide hydrochloride salt. The composition is substantially solid.

In various embodiments, the present invention provides a composition. The composition includes about 0.001 wt % to about 50 wt % ammonium bifluoride, about 20 wt % to about 99 wt % urea hydrochloride, and about 5 wt % to about 60 wt % of a chelating agent that is at least one chosen from polyaspartic acid, methylglycine diacetic acid (MGDA), iminodisuccinic acid (IDS), hydroxyethylene iminodisuccinic acid (HIDS), hydroxyethylethylenediaminetriacetic acid (HEDTA), and glutamic acid diacetic acid (GLDA). The composition is substantially solid.

In various embodiments, the present invention provides a method of preparing a composition for treatment of a subterranean formation. The method includes forming a substantially solid composition including a hydrogen fluoride precursor salt and an amide hydrochloride salt.

Various embodiments of the present invention provide certain advantages over other methods and compositions for acid stimulation of subterranean formations. Most techniques for contacting subterranean formations with HCl or HF require transport, handling, and mixing of liquid HCl or HF. For example, some compositions for acidization require the addition of HCl or HF before the time of use, such as to lower the pH to acceptable levels for acidization or for adequate performance of other materials such as chelating agents. Various embodiments provide a solid precursor of HCl and HF that is free of many disadvantages of handling and transporting liquid HCl and HF, and yet still provides HCl and HF in a desired location downhole. In various embodiments, at least one of the HCl and HF can be released from the solid precursor by exposure to water before placing downhole or at a downhole location.

In various embodiments, the substantially solid composition can provide an acidization composition with only the addition of water, or with only the addition of non-HCl or non-HF materials, with optional use of only small amounts of HCl or HF, thus avoiding or reducing the transport, handling, or mixing of liquid HCl or HF. For example, in various embodiments, the composition can be blended with only water to provide an effective acidization composition that provides HCl or HF downhole. In various embodiments, the avoidance or reduction of transport, handling, and mixing of liquid HCl and HF can reduce costs and hazards of performing acidization and can facilitate use of the composition in offshore or remote locations. In various embodiments, by enabling the use of water instead of liquid HCl or HF, water that is available near the well site can be used instead of transported HCl or HF, thereby increasing convenience and decreasing costs. In various embodiments, the effective amount of acidization provided per mass of material transported can be significantly higher than that provided by compositions that require hazardous transport of liquid HCl or HF.

With some methods and compositions, the concentration of various components of the acidization composition, such as the amount of acid content, can be difficult to adjust while performing the acidization. However, in various embodiments, the composition can be mixed on the fly, providing facile adjustment of the concentration of various components used for acidization. In various embodiments, by mixing the composition on the fly, the strength of the acid can be quickly and easily controlled, allowing for more precise control over the rate and amount of acidization occurring in various locations downhole at various times during the treatment.

Acidization methods and compositions that include liquid HCl or HF generally cause the downhole regions and equipment from the surface to a location of desired acidification to be exposed to acidic conditions. In various embodiments, the acid content of the composition can be modulated such that the composition does not produce at least one of HCl and HF, or only produces limited amounts of at least one of HCl and HF, until the composition is at or near a desired location for acidification, at which time at least one of HCl and HF can be released. For example, in some embodiments, the substantially solid composition can be suspended in a solvent that does not significantly dissolve the composition such as an organic or oil-based solvent. In various embodiments, the suspension or slurry of the solid composition can be transported through equipment and downhole areas before allowing the solid composition to contact water, thereby triggering the release of HCl, HF, and the corresponding decrease of pH, thus providing a delayed-effect acid treatment. By delaying the release of HCl and HF, various embodiments of the composition and method can produce less corrosion and other damage to equipment on the surface and between the surface and an acidized region downhole, such as pumps and tubulars, which can significantly decrease the cost of the treatment compared to other acidization treatments. By delaying the release of HCl, various embodiments of the composition and method can produce less damage to subterranean areas that are not desired to be acidized, thus avoiding damage such as matrix deconsolidation, and provide greater production of fluids, thereby providing a greater value than other acidization treatments. In some embodiments, the delayed-effect acidification suspension or slurry can be used to delivery a slug of the composition to a fracture (e.g., natural or artificially generated) or other desired area that can be contacted later with water, such as overflush water or produced water, or such as during standard acidization treatment with liquid HCl, HF, or another aqueous acid, to provide enhanced acidization of the region having the slug therein. In some embodiments, by delaying the decrease in pH, HCl and HF can be administered to depths or areas not normally treatable with uncontrolled stimulation agents, since other stimulation agents would be partially or fully consumed before reaching the area. In some embodiments, by using a suspension or slurry of the composition, the composition can be placed downhole using organic or oil flushes, decreasing the overall number of pumping stages and thereby decreasing cost.

In various embodiments, a suspension or slurry of the substantially solid composition in a solvent that does not significantly dissolve the composition has diverting properties when placed downhole. For example, in various embodiments, a suspension or slurry of the substantially solid composition can be designed to build up a filter cake or other plug in high permeability areas, such as by addition of viscosifiers such as gelling agents, or by use of lost circulation materials (e.g., as part of the composition, or as part of a separate treatment performed prior to placing the composition downhole), thereby plugging high permeability flow paths and providing the composition to areas having lower permeability for acidification upon activation of the acid precursors. In various embodiments, a suspension or slurry of the substantially solid composition can be designed to flow mainly to high permeability areas, thereby providing acidification of a desired high permeability region upon contacting with water and providing better zonal coverage. In some embodiments, the size of the particulates of the solid composition can be adjusted to provide penetration to a desired depth or region, which is difficult or impossible with traditional acidization mixtures including HCl or HF. In various embodiments, the solid composition can be used for acid clean-up of a wellbore or tubulars (e.g., pickling).

Method of Treating a Subterranean Formation.

In some embodiments, the present invention provides a method of treating a subterranean formation. The method includes obtaining or providing a substantially solid composition including a hydrogen fluoride salt and an amide hydrochloride salt. The obtaining or providing of the substantially solid composition can occur at any suitable time and at any suitable location. The obtaining or providing of the substantially solid composition can occur above the surface. The obtaining or providing of the composition can occur downhole. The method also includes placing the composition in a subterranean formation. The method can include forming a mixture of the composition and a carrier fluid and placing the mixture downhole. The formation of the mixture can occur at any suitable time and at any suitable location. The formation of the mixture can occur above the surface. The formation of the mixture can occur downhole. The placing of the mixture in the subterranean formation can include contacting the mixture and any suitable part of the subterranean formation, or contacting the mixture and a subterranean material downhole. The subterranean formation can be any suitable subterranean formation. In some examples, the placing of the mixture in the subterranean formation includes contacting the mixture with, or placing or depositing the mixture in, at least one of a fracture, at least a part of an area surrounding a fracture, a flow pathway, an area surrounding a flow pathway, and an area desired to be fractured. The placing of the mixture in the subterranean formation can be any suitable placement technique and can include any suitable contacting between the subterranean formation and the mixture.

In some embodiments, the method can include acidizing the subterranean formation using the substantially solid composition. The acidized subterranean formation can be any suitable subterranean formation. In some examples, the subterranean formation that is acidized has less than 20 wt % calcium. In some examples, the subterranean formation that is acidized includes at least one of a sandstone formation and a shale formation.

In some embodiments, the method can include hydraulic fracturing, such as a method of hydraulic fracturing to generate a fracture or flow pathway. The placing of the mixture in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). For example, in some examples, the method can include fracture acidizing using the composition. The method can include performing a stimulation treatment at least one of before, during, and after placing the mixture in the subterranean formation in the fracture, flow pathway, or area surrounding the same. The stimulation treatment can be, for example, at least one of perforating, acidizing, injecting of cleaning fluids, propellant stimulation, and hydraulic fracturing (e.g., fracture acidizing or other hydraulic fracturing). In some embodiments, the stimulation treatment at least partially generates a fracture or flow pathway where the mixture is placed or contacted, or the mixture is placed or contacted to an area surrounding the generated fracture or flow pathway.

The mixture including the carrier fluid and the substantially solid composition can include any suitable amount of the carrier fluid. For example, the carrier fluid can be about 20 wt % to about 99.999 wt % of the mixture, or about 50 wt % to about 90 wt %, or about 20 wt % or less, or about 25 wt %, 30, 35, 40, 45, 50, 55, 60, 65, 70, 75, 80, 85, 90, 95, 96, 97, 98, 99, 99.9, 99.99 wt %, or about 99.999 wt % or more of the mixture. The carrier fluid can be any suitable carrier fluid. The carrier fluid can include at least one of an aqueous fluid, an oxygenated organic fluid, and a hydrocarbon oil. The carrier fluid can include at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl formamide, diesel, kerosene, mineral oil, a hydrocarbon comprising an internal olefin, a hydrocarbon comprising an alpha olefin, xylenes, an ionic liquid, methyl ethyl ketone, and cyclohexanone. The carrier fluid can include at least one of water, brine, produced water, flowback water, brackish water, and sea water. In some embodiments, the carrier fluid includes, or the mixture further includes, an aqueous or oil-based fluid comprising a stimulation fluid, fracturing fluid, spotting fluid, clean-up fluid, completion fluid, remedial treatment fluid, pill, acidizing fluid, or a combination thereof.

The mixture including the carrier fluid and the substantially solid composition can include the substantially solid composition in a substantially undissolved form, a dissolved form, or a substantially dissolved form. In some embodiments, the substantially solid composition is substantially a particulate solid in the mixture when placed in the subterranean formation; the mixture can be substantially free of added mineral acid, or the mixture can include added mineral acid. In some embodiments, the mixture is substantially free of dissolved acid. In some embodiments, at least partial or substantially full dissolution of the substantially solid composition can occur prior to placing the mixture in the subterranean formation. In some embodiments, the substantially solid composition at least partially or substantially fully dissolves at least one of during and after placing in the subterranean formation.

In embodiments wherein the mixture including the substantially solid composition and the carrier fluid includes an aqueous component, the aqueous component of the mixture can have any suitable pH. Prior to dissolution of the substantially solid composition, the aqueous component of the mixture can have a pH of 0 to about 14, or about 0 to about 8, or about 0 or less, or about 1, 2, 3, 4, 5, 6, 7, 8, 9, 10, 11, 12, 13, or about 14. After partial or substantially full dissolution of the substantially solid composition in an aqueous solution, the aqueous solution can have a pH of about 0 to about 5, or less than about 4, or less than about 3.7, or about 0 or less, 0.25, 0.5, 0.75, 1, 1.25, 1.5, 1.75, 2, 2.25, 2.5, 2.75, 3, 3.25, 3.5, 3.75, 4, 4.25, 4.5, 4.75, or about 5 or more.

The mixture including the substantially solid composition and the carrier fluid, or an aqueous solution that contacts the mixture, can include any suitable HF concentration. Prior to dissolution of the substantially solid composition, the mixture or an aqueous solution that is to contact the mixture can have an HF concentration of about 0% w/v, or about 0.001% w/v to about 50% w/v, or about 0.001% w/v or less, or about 0.01% w/v, 0.1, 1, 2, 3, 4, 5, 10, 15, 20, 25, 30, 35, 40, 45, or about 50% w/v or more. After partial or substantially full dissolution of the substantially solid composition, the mixture or an aqueous solution that contacts the mixture can have an HF concentration of about 0.01% w/v to about 50% w/v, or about 0.1% w/v to about 20% w/v, or about 0.01% w/v or less, or about 0.1% w/v, 1, 2, 3, 4, 5, 10, 15, 20, 25, 30, 35, 40, 45, or about 50% w/v or more.

The mixture including the substantially solid composition and the carrier fluid can include any concentration of salt therein. For example, prior to dissolution of the substantially solid composition, the mixture can have a concentration of at least one of NaBr, $CaCl_2$, $CaBr_2$, $ZnBr_2$, KCl, and NaCl of about 0% w/v to about 20% w/v, or about 0.1% w/v or less, or about 0.5% w/v, 1, 2, 4, 6, 8, 10, 12, 14, 16, 18, or about 20% w/v or more. After partial or substantially full dissolution of the substantially solid composition, the mixture can have a concentration of at least one of NaBr, $CaCl_2$, $CaBr_2$, $ZnBr_2$, KCl, and NaCl of about 0.1% w/v to about 20% w/v, or about 0.1% w/v or less, or about 0.5% w/v, 1, 2, 3, 4, 5, 6, 7, 8, 9, 10, 11, 12, 13, 14, 15, 16, 17, 18, 19, or about 20% w/v or more.

Hydrogen Fluoride Precursor Salt.

The substantially solid composition includes a hydrogen fluoride precursor salt. Upon partial or substantially full dissolution of the substantially solid composition including the hydrogen fluoride precursor salt, the hydrogen fluoride precursor salt can provide HF in the mixture. The hydrogen fluoride precursor salt can be any suitable salt that, upon dissolution, provides HF, such as in the presence of a strong mineral acid (e.g., HCl or $H_2SO_4$). The hydrogen fluoride precursor salt can form any suitable proportion of the substantially solid composition, such as about 0.1 wt % to about 50 wt %, about 0.5 wt % to about 10 wt %, or about 0.1 wt % or less, or about 0.5 wt %, 1, 2, 3, 4, 5, 6, 7, 8, 9, 10, 15, 20, 25, 30, 35, 40, 45, or about 50 wt % or more. The hydrogen fluoride precursor salt can form any suitable proportion of the mixture of the substantially solid composition and the carrier fluid, such as about 0.000.1 wt % to about 40 wt %, or about 0.05 wt % to about 5 wt %, or about 0.000.1 wt % or less, or about 0.001 wt %, 0.01, 0.1, 1, 2, 3, 4, 5, 10, 15, 20, 25, 30, 35 wt %, or about 40 wt % or more of the mixture.

The hydrogen fluoride precursor salt can include at least one of a fluoride salt (e.g., a hydrogen fluoride salt) or a bifluoride salt (e.g., hydrogen difluoride salt). A bifluoride anion, having the formula $HF_2^-$ can also be referred to as difluorohydrogenide, difluoridohydrogenate, or hydrogen (difluoride). The hydrogen fluoride precursor salt can be at least one chosen from a fluoride or bifluoride salt of a substituted or unsubstituted $(C_1$-$C_{50})$hydrocarbyl having at least one amine or amide functional group thereon (e.g., a quaternary nitrogen salt resulting from reaction of an amine or amide and HF), an inorganic fluoride (e.g., potassium fluoride) or bifluoride salt (e.g., sodium bifluoride or potassium bifluoride), a tetra($(C_1$-$C_{10})$hydrocarbyl)ammonium fluoride, ammonium fluoride, ammonium bifluoride, an alkali or ammonium tetrafluoroborate salt, an alkali or ammonium hexafluorophosphate salt, and polyvinylpyridinium fluoride. When the fluoride or bifluoride salt includes a hydrocarbyl group, each hydrocarbyl is independently selected. In some embodiments, the hydrogen fluoride precursor salt is ammonium bifluoride.

Amide Hydrochloride Salt.

The substantially solid composition can include an amide hydrochloride salt. The amide hydrochloride salt can be any suitable compound including at least one amide functional group in the form of a hydrochloride salt. Upon partial or substantially full dissolution of the substantially solid composition including the amide hydrochloride salt, the amide hydrochloride salt can provide HCl in the mixture. The amide hydrochloride salt can form any suitable proportion of the substantially solid composition, such as about 20 wt % to about 99 wt % of the substantially solid composition, about 60 to about 90 wt %, or about 20 wt % or less, or about 25 wt %, 30, 35, 40, 45, 50, 55, 60, 65, 70, 75, 80, 85 wt %, or about 90 wt % or more. The amide hydrochloride salt can form any suitable proportion of the mixture of the substantially solid composition and the carrier fluid, such as about 0.000.1 wt % to about 80 wt %, or about 5 wt % to about 50 wt %, or about 0.000.1 wt % or less, or about 0.001 wt %, 0.01, 0.1, 1, 2, 3, 4, 5, 10, 15, 20, 25, 30, 35, 40, 45, 50, 55, 60, 65, 70, 75, or about 80 wt % or more of the mixture.

The amide hydrochloride salt can be a hydrochloride salt of a substituted or unsubstituted $(C_1$-$C_{50})$hydrocarbyl having at least one amide functional group thereon, formamide hydrochloride, di($C_1$-$C_{10}$)hydrocarbylformamide hydrochloride, dimethylformamide hydrochloride, acetamide hydrochloride, di($C_1$-$C_{10}$)hydrocarbylacetamide hydrochloride, dimethylacetamide hydrochloride, carbamimidoylurea hydrochloride, imidourea hydrochloride (e.g., guanidine hydrochloride), and urea hydrochloride. In embodiments wherein the amide hydrochloride salt includes hydrocarbyl groups, each hydrocarbyl is independently selected. In some embodiments, the amide hydrochloride salt is urea hydrochloride.

Chelating Agent.

The substantially solid composition can optionally include a chelating agent. In some embodiments, the substantially solid composition is free of a chelating agent. In other embodiments, the substantially solid composition can include a chelating agent. The chelating agent can be any suitable chelating agent. The chelating agent can form any suitable proportion of the substantially solid composition, such as about 5 wt % to about 60 wt % of the substantially solid composition, about 10 wt % to about 20 wt %, or about 5 wt % or less, or about 10 wt %, 15, 20, 25, 30, 35, 40, 45, 50, 55, or about 60 wt % or more. The chelating agent can form any suitable proportion of the mixture of the substantially solid composition and the carrier fluid, such as about 0.000.1 wt % to about 50 wt %, or about 1 wt % to about 10 wt %, or about 0.000.1 wt % or less, or about 0.0001 wt %, 0.01, 0.1, 1, 2, 3, 4, 5, 10, 15, 20, 25, 30, 35, 40, 45 wt %, or about 50 wt % or more of the mixture.

In some embodiments, the chelating agent is at least one chosen from an aminopolycarboxylate, a gluconate, an organophosphonate, and a glucoheptonate. The chelating agent can be at least one chosen from polyaspartic acid, methylglycine diacetic acid (MGDA), glutamic acid N,N-diacetic acid (GLDA), L-aspartic acid N,N-diacetic acid (ASDA), cysteic acid-N,N-diacetic acid, cysteic acid-N-monoacetic acid, alanine-N-monoacetic acid, N-(3-hydroxysuccinyl)aspartic acid, N-[2-(3-hydroxysuccinyl)]-L-serine, diethanolglycine/2-hydroxyethyliminodiacetic acid (DEG/HEIDA), iminodisuccinic acid (IDS), hydroxyethylene iminodisuccinic acid (HIDS), N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), ethylenediaminedisuccinic acid (EDDS), ethylenediaminetetraacetic acid (EDTA), diethylenetriaminepentaacetic acid (DTPA), hydroxyethylethylenediaminetriacetic acid (HEDTA), 1,3-propylenediaminetetraacetic acid (1,3-PDTA), nitrilotriacetic acid (NTA), gluconic acid, glucoheptonic acid, sodium tripolyphosphate (STPP), trisodium phosphate (TSP), aminotris(methylene phosphonic acid) (ATMP), ethylenediamine tetra(methylene phosphonic acid) (EDTMP), diethylenetriamine penta(triethylene phosphonic acid)) (DTPMP), 1-hydroxy ethylidene-1,1-diphosphonic acid (HEDP), phosphonobutanetricarboxylic acid (PBTC), hexamethylenediamine tetra(methylene phosphonic acid)) (HDTMP), N-(2-acetamido)iminodiacetic acid (ADA), hydroxymethyl-iminodiacetic acid, 2-(2-carboxyethylamino)succinic acid (CEAA), 2-(2-carboxymethylamino) succinic acid (CMAA), diethylenetriamine-N,N"-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, citric acid, tartaric acid, maleic acid, and a salt of any member of the preceding list (e.g., any suitable salt, such as a sodium, potassium, ammonium, calcium, or lithium salt). In some embodiments, the chelating agent is at least one chosen from polyaspartic acid, methylglycine diacetic acid (MGDA), iminodisuccinic acid (IDS), hydroxyethylene iminodisuccinic acid (HIDS), hydroxyethylethylenediaminetriacetic acid (HEDTA), and glutamic acid diacetic acid (GLDA).

Other Components.

The substantially solid composition or the mixture including the substantially solid composition can include any one or more suitable components in any suitable proportion, such that the composition or mixture can be used as described herein.

In some embodiments, the composition or mixture can include a viscosifier. The viscosifier can be any suitable viscosifier that is capable of viscosifying the carrier fluid that carries the composition in the mixture, or a solvent that contacts the mixture. The viscosifier can affect the viscosity of the mixture or a solvent that contacts the mixture at any suitable time and location. In some embodiments, the viscosifier provides an increased viscosity at least one of before injection downhole, at the time of injection downhole, during travel through a tubular disposed in a borehole, once the mixture reaches a particular downhole location, or some period of time after the mixture reaches a particular downhole location. In some embodiments, the viscosifier can provide some or no increased viscosity until the viscosifier reaches a desired location downhole, at which point the viscosifier can provide a small or large increase in viscosity in the mixture or a solvent that contacts the mixture such as an aqueous solvent.

In some embodiments, the viscosifier, such as for a mixture including an aqueous carrier fluid or for a mixture that contacts an aqueous solvent, includes at least one of a linear polysaccharide, and poly(($C_2$-$C_{10}$)alkenylene), wherein at each occurrence the ($C_2$-$C_{10}$)alkenylene is independently substituted or unsubstituted. In some embodiments, the viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly (vinyl alcohol), poly(ethylene glycol), poly(vinyl pyrrolidone), polyacrylamide, poly (hydroxyethyl methacrylate), alginate, chitosan, curdlan, dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, welan, derivatized starch, tamarind, tragacanth, guar gum, derivatized guar (e.g., hydroxypropyl guar, carboxy methyl guar, or carboxymethyl hydroxylpropyl guar), gum ghatti, gum arabic, locust bean gum, and derivatized cellulose (e.g., carboxymethyl cellulose, hydroxyethyl cellulose, carboxymethyl hydroxyethyl cellulose, hydroxypropyl cellulose, or methyl hydroxyl ethyl cellulose).

In some embodiments, the viscosifier, such as for a mixture including an aqueous carrier fluid or for a mixture that contacts an aqueous solvent, can include a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstitued ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted $(C_1-C_{20})$alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted $(C_1-C_{20})$alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted $(C_1-C_{20})$alkenoic substituted or unsubstituted $(C_1-C_{20})$alkanoic anhydride, a substituted or unsubstituted $(C_1-C_{20})$alkenoic substituted or unsubstituted $(C_1-C_{20})$alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—$(C_1-C_{10})$alkenyl nitrogen containing substituted or unsubstituted $(C_1-C_{10})$heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly(vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

A mixture including an aqueous carrier fluid or that contacts an aqueous solvent can include one or more crosslinkers including at least one of chromium, aluminum, antimony, zirconium, titanium, calcium, boron (e.g., as boric acid, a borate, or borax), iron, silicon, copper, zinc, magnesium, and an ion thereof. The composition can include one or more crosslinkers including at least one of ferric chloride, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate, titanium lactate, titanium malate, titanium citrate, titanium ammonium lactate, titanium triethanolamine, titanium acetylacetonate, aluminum lactate, or aluminum citrate.

When the carrier fluid is a non-aqueous fluid in which solid composition is not soluble or only sparingly soluble, the solid suspension can be stabilized against settling by the addition of suspending aids such as polymeric viscosifiers, organophilic clays, fibrous materials, and the like. Such suspending aids can in some embodiments increase viscosity of the carrier fluid. Suitable examples of polymeric suspending aids can include styrene-butadiene copolymers. Examples of commercial organophilic clays can include GELTONE® organophilic clays.

Downhole Mixture or Composition.

The substantially solid composition can be combined with any suitable downhole fluid before, during, or after the placement of the composition in the subterranean formation or the contacting of the composition and the subterranean material. In some examples, the substantially solid composition is combined with a downhole fluid above the surface, and then the mixture is placed in a subterranean formation or contacted with a subterranean material. In another example, the substantially solid composition is injected into a subterranean formation to combine with a downhole fluid, and the mixture is contacted with a subterranean material or is considered to be placed in the subterranean formation. In various examples, at least one of prior to, during, and after the placement of the mixture in the subterranean formation or contacting of the subterranean material and the mixture, the mixture is used downhole, at least one of alone and in combination with other materials, as a stimulation fluid, fracturing fluid, spotting fluid, clean-up fluid, completion fluid, remedial treatment fluid, pill, acidizing fluid, or a combination thereof.

In various embodiments, the method includes combining the substantially solid composition with any suitable downhole fluid, such as an aqueous or oil-based fluid including a stimulation fluid, fracturing fluid, spotting fluid, clean-up fluid, completion fluid, remedial treatment fluid, pill, acidizing fluid, or a combination thereof, to form a mixture. In some embodiments, the substantially solid composition can be combined with a carrier fluid, wherein the carrier fluid can be a downhole fluid, another fluid, or a combination thereof. The placement of the mixture in the subterranean formation can include contacting the subterranean material and the composition. The contacting of the subterranean material and the composition (e.g., as a solid composition or as a dissolved form thereof) can include contacting the subterranean material and the mixture. Any suitable weight percent of a mixture that is placed in the subterranean formation or contacted with the subterranean material can be the substantially solid composition or a dissolved form thereof, such as about 0.000.1 to about 99.999.9 wt %, about 0.1 wt % to about 99.9 wt %, about 20 to about 90 wt %, or about 0.000.1 wt % or less, or about 0.001 wt %, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, or about 99.999.9 wt % or more of the mixture.

In some embodiments, the composition can include any suitable amount of any suitable material used in a downhole fluid. For example, the composition can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts, fibers, thixotropic additives, breakers, crosslinkers, rheology modifiers, pH modifiers, chelating agents, scale inhibitors, enzymes, resins, water control materials, oxidizers, markers, or a combination thereof. In various embodiments, the composition can include one or more additive components such as: additives for providing temporary increased viscosity, such as for shipping (e.g., transport to the well site) and for use in sweeps (for example, additives having the trade name TEMPERUS™ (a modified fatty acid) and VIS-PLUS®, a thixotropic viscosifying polymer blend); TAU-MOD™, a viscosifying/suspension agent including an amorphous/fibrous material; additives for filtration control, for example, ADAPTA®, a high temperature high pressure (HTHP) filtration control agent including a crosslinked copolymer; DURATONE® HT, a filtration control agent that includes an organophilic lignite, more particularly organophilic leonardite; BARACARB®, a sized ground marble bridging agent; BAROID®, a ground barium sulfate weighting agent; BAROLIFT®, a hole sweeping agent. Any suitable proportion of the substantially solid composition or mixture including the composition can include any optional component listed in this paragraph, such as about 0.000.1 wt % to about 99.999.9 wt %, about 0.1 wt % to about 99.9 wt %, about 20 to about 90 wt %, or about 0.000.1 wt % or less, or about 0.001 wt %, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, 99.999.9 wt %, or about 99.999.9 wt % or more of the composition or mixture.

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

In various embodiments, the composition or mixture can include a proppant, a resin-coated proppant, an encapsulated resin, or a combination thereof. A proppant is a material that keeps an induced hydraulic fracture at least partially open during or after a fracturing treatment. Proppants can be transported downhole to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ available from DuPont), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The substantially solid composition can include any suitable amount of proppant, such as about 1 wt % to about 99.9 wt %, 5 wt % to 50 wt %, about 10 wt % to about 50 wt %, or about 1 wt % or less, or about 2 wt %, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more. The mixture including the substantially solid composition and the carrier fluid can include any suitable amount of proppant, such as about 0.000.1 wt % to about 99.9 wt %, 0.1 wt % to 50 wt %, about 10 wt % to about 50 wt %, or about 0.000.1 wt % or less, or about 0.001 wt %, 0.01, 0.1, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

System or Apparatus.

In various embodiments, the present invention provides a system. The system can be any suitable system that can use or that can be generated by use of the substantially solid composition described herein in a subterranean formation, or that can include performance of a method for using the substantially solid composition described herein. The system can include an embodiment of the substantially solid composition or of a mixture including the same. The system can also include a subterranean formation including the composition or a mixture thereof therein. In some embodiments, the mixture in the system can also include at least one of a carrier fluid and a downhole fluid.

In some embodiments, the system can include a tubular disposed in a wellbore. The system can include a pump configured to pump the composition or a mixture thereof downhole through the tubular and into the subterranean formation. In some embodiments, the system can include a subterranean formation including the composition or a mixture thereof therein.

In various embodiments, the present invention provides an apparatus. The apparatus can be any suitable apparatus that can use or that can be generated by use of the substantially solid composition described herein in a subterranean formation, or that can include performance of a method for using the substantially solid composition described herein.

Various embodiments provide systems and apparatus configured for delivering the composition described herein to a downhole location and for using the composition therein, such as for acidizing. In various embodiments, the systems can include a pump fluidly coupled to a tubular (e.g., any suitable type of oilfield pipe, such as pipeline, drill pipe, production tubing, and the like), the tubular containing a composition including the substantially solid composition described herein.

The pump can be a high pressure pump in some embodiments. As used herein, the term "high pressure pump" will refer to a pump that is capable of delivering a fluid downhole at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include, but are not limited to, floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery downhole.

FIG. 1 shows an illustrative schematic of systems and apparatuses that can deliver embodiments of the compositions of the present invention to a downhole location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature, and various additional components can be present that have not necessarily been depicted in FIG. 1 in the interest of clarity. Non-limiting additional components that can be present include, but are not limited to, supply hoppers, valves, condensers, adapters, joints, gauges, sensors, compressors, pressure controllers, pressure sensors, flow rate controllers, flow rate sensors, temperature sensors, and the like.

It is also to be recognized that the disclosed composition can also directly or indirectly affect the various downhole equipment and tools that can come into contact with the composition during operation. Such equipment and tools can include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 1.

Composition for Treatment of a Subterranean Formation.

Various embodiments provide a composition for treatment of a subterranean formation. The composition can be any suitable composition that can be used to perform an embodiment of the method for treatment of a subterranean formation described herein. For example, the composition can be a substantially solid composition that includes a hydrogen fluoride precursor salt and an amide hydrochloride salt. Various embodiments provide a mixture of an embodiment of the composition and at least one of a carrier fluid and a downhole fluid. In some embodiments, the composition or mixture is for acidizing a subterranean formation.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming an embodiment of the substantially solid composition or a mixture thereof, including a hydrogen fluoride precursor salt and an amide hydrochloride salt.

EXAMPLES

Various embodiments of the present invention can be better understood by reference to the following Examples which are offered by way of illustration. The present invention is not limited to the Examples given herein.

Example 1. Preparation of Samples

U-TMP: This sample was prepared by adding 8 g of methylglycine diacetic acid (MGDA) powder (78-81% MGDA-Na$_3$, commercially available from BASF as Trilon M®) to 30 ml of water while mixing. Approximately 22 g of urea hydrochloride (U) was then added to the solution to set the pH of water before the addition of the 1.6 g of ammonium bifluoride (ABF). After the addition of the ABF, more urea hydrochloride was added (13 g) in order to help dissolve the remaining ABF and to lower the pH (a lower pH keeps the ABF in solution).

U-TMP liquid: This sample was prepared by taking the masses of each solid (MGDA, urea hydrochloride and ABF) from U-TMP, mixing them in a container, and then adding them to water. The solution was given time to stir and the solids dissolved with a final pH <4 (specifically 3.66).

TMP Solid: This sample was taken from the stock MGDA powder provided by the manufacturer—nothing was added to this solid.

TMP Liquid: This sample was prepared by dissolving 2 g of Urea-HCl in approximately 50 ml of water (pH=1.6). The MGDA powder (8 g) was then added to the solution while mixing (pH=10.5).

Table 1 shows the amount of MGDA, urea hydrochloride, and ABF in each sample.

TABLE 1

Example 1 samples.

| Sample Name | Mass of MGDA Powder (g) | Mass of Urea-HCl (g) | Mass of Ammonium Bifluoride (ABF) (g) | Water | Total Volume |
|---|---|---|---|---|---|
| U-TMP | 8 | 35 | 1.6 | — | — |
| U-TMP liquid | 8 | 35 | 1.6 | As needed | 100 mL |
| TMP Solid | 8 | — | — | — | — |
| TMP Liquid | 8 | 2 | — | As needed | 50 mL |

Example 2. Sodium Concentration

The concentration of Na in U-TMP from Example 1 was determined by inductively coupled plasma (ICP) analysis along with a pH measurement for the fluid sample (Table 2). The sodium content shows that the fluid has sufficient sodium to make up a brine corresponding to low salinity if desired.

TABLE 2

ICP and pH Data

| Sample | Na (ppm) | pH |
|---|---|---|
| U-TMP | 20606 | 3.66 |

The pH of the fluid is suitable for an HF acidizing composition. Lower pH values can be generated by adding more urea hydrochloride. Also, higher or lower concentrations of HF can be attained by adjusting the amount of ABF. Equally, higher concentrations of MGDA can be delivered by increasing the amount of solid MGDA, which in turn can increase the concentration of sodium.

Example 3. NMR Analysis

Figure 2B:
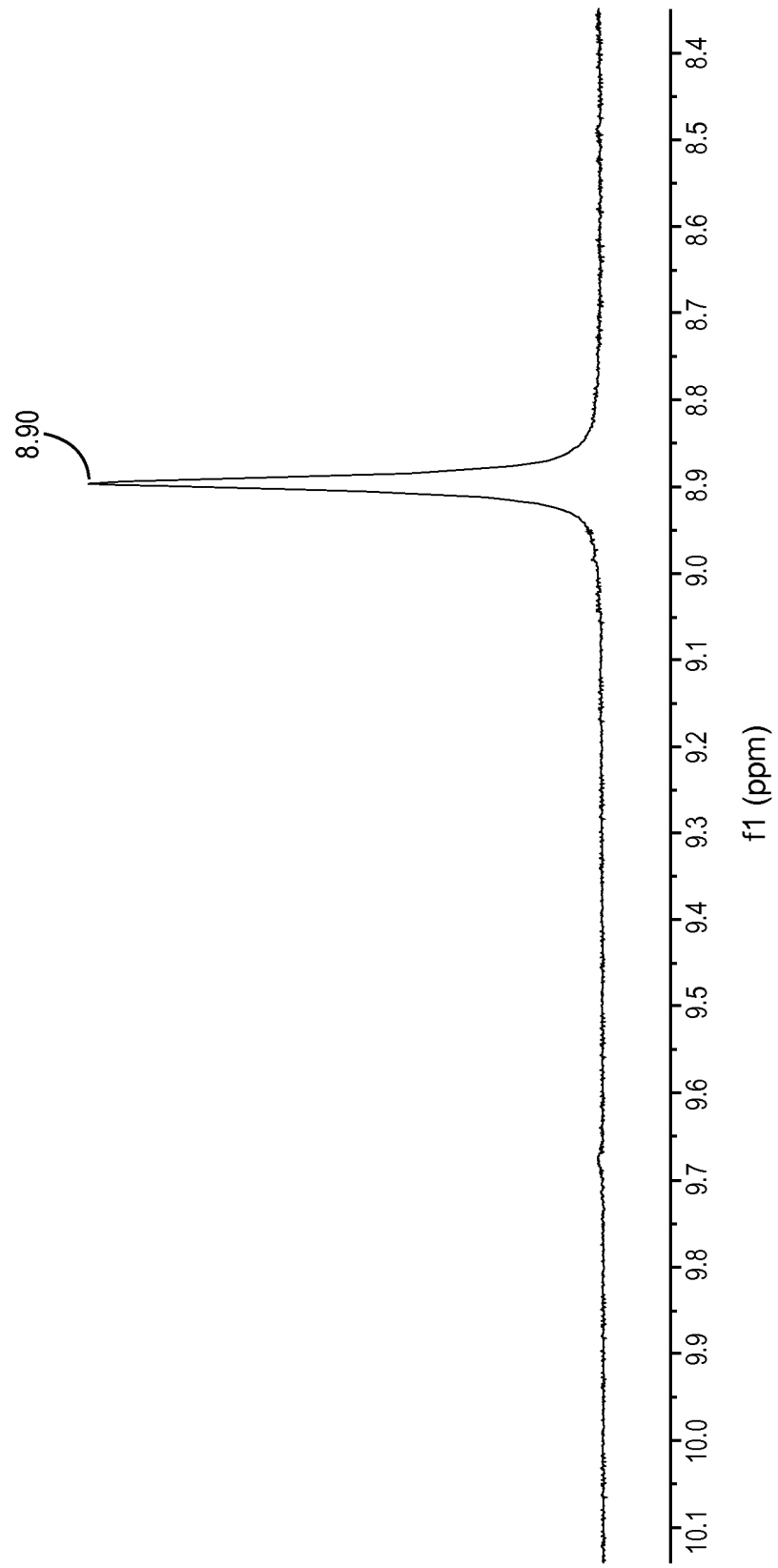
Figure 3:
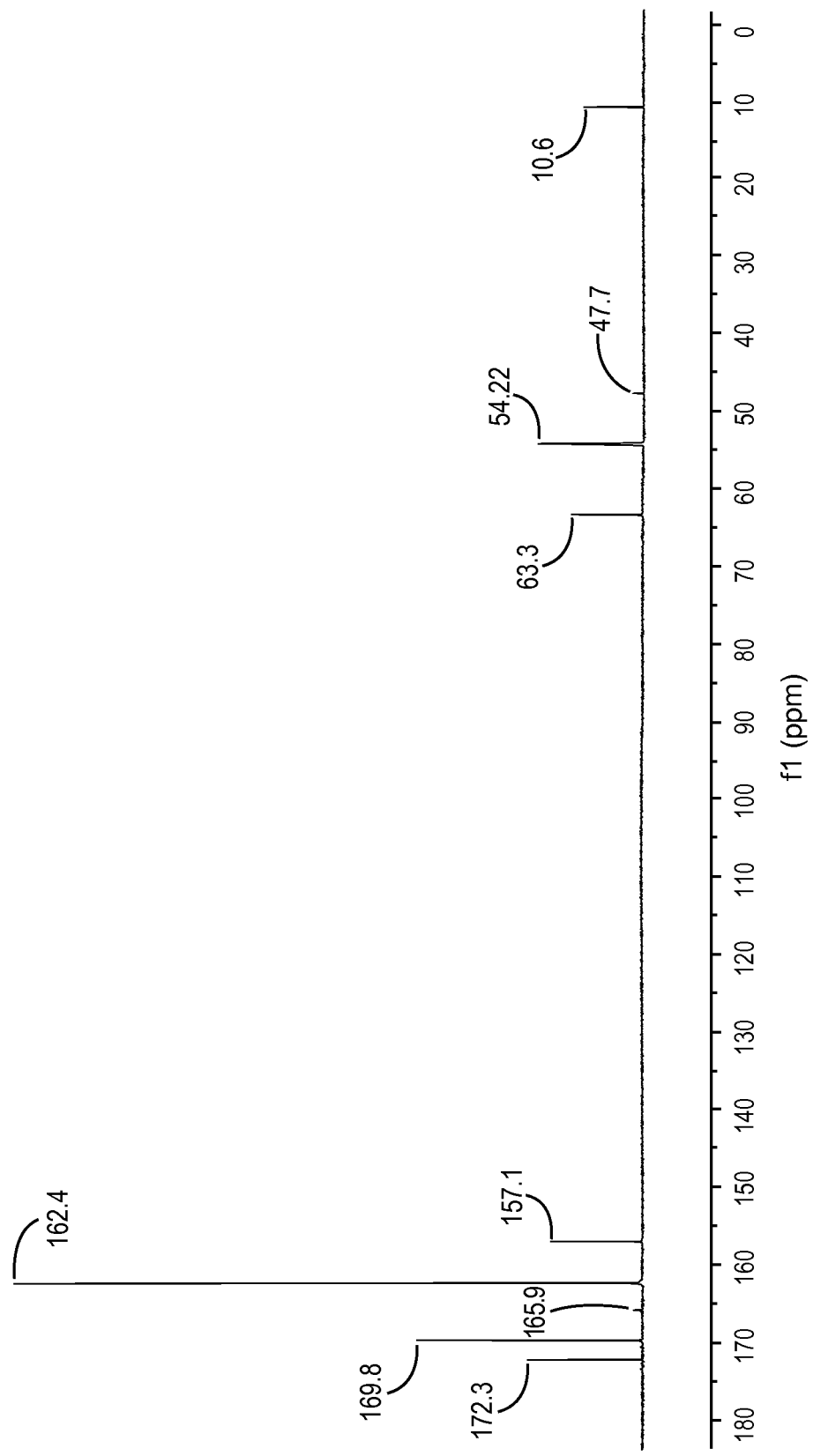
FIG. 3 illustrates a $^{13}$C NMR spectrum of U-TMP from Example 1, also in $D_2O$, in accordance with various embodiments.
Figure 4:
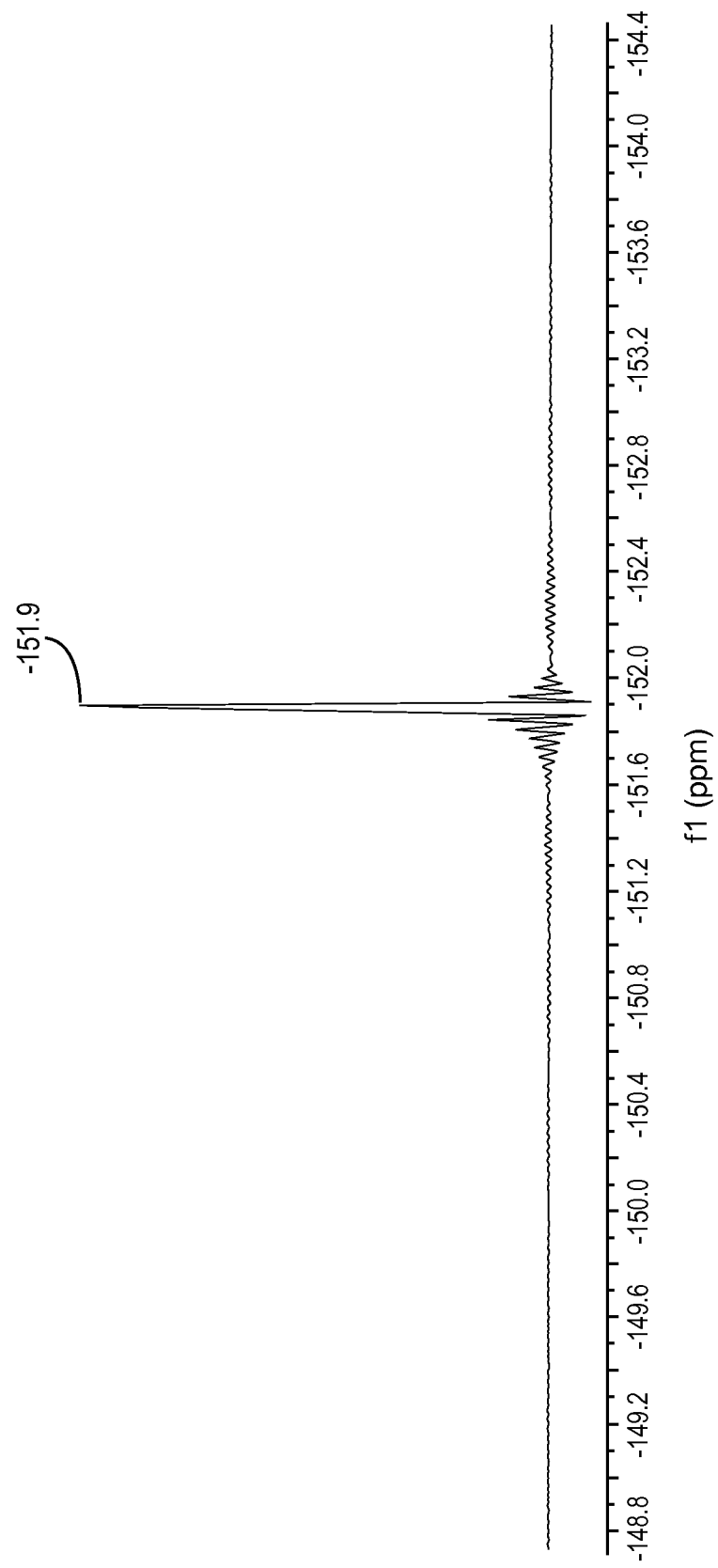
FIG. 4 illustrates a $^{19}$F NMR spectrum of U-TMP from Example 1, taken in $D_2O$, in accordance with various embodiments.

FIGS. 2a and 2b illustrate high field and low field regions, respectively, of an $^1$H NMR spectrum of U-TMP from Example 1, taken in $D_2O$. FIG. 3 illustrates a $^{13}$C NMR spectrum of U-TMP from Example 1, also in $D_2O$. The proton signals correspond to the methyl glycine diacetic acid molecule, and the urea molecule, at the pH of the fluid (pH 3.66); the same applied to the carbon spectrum. FIG. 4 illustrates a $^{19}$F NMR spectrum of U-TMP from Example 1, taken in $D_2O$. The fluorine spectrum clearly shows the presence of HF at about −152 ppm, expected at this pH. Free fluoride (F$^-$) resonates at −119 to −115 ppm depending on ionic strength. At lower pH, the HF signal at −152 ppm would be expected to shift to even lower fields (e.g., −160 ppm at a pH of about 1).

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

ADDITIONAL EMBODIMENTS

The following exemplary embodiments are provided, the numbering of which is not to be construed as designating levels of importance:

Embodiment 1 provides a method of treating a subterranean formation, the method comprising:

obtaining or providing a substantially solid composition comprising a hydrogen fluoride precursor salt; and an amide hydrochloride salt;

combining the substantially solid composition with a carrier fluid, to form a mixture; and placing the mixture in a subterranean formation downhole.

Embodiment 2 provides the method of Embodiment 1, wherein the method is a method for acidizing the subterranean formation.

Embodiment 3 provides the method of any one of Embodiments 1-2, wherein calcium content of the subterranean formation is less than about 20 wt %.

Embodiment 4 provides the method of any one of Embodiments 1-3, wherein the subterranean formation comprises at least one of a sandstone formation and a shale formation.

Embodiment 5 provides the method of any one of Embodiments 1-4, wherein the obtaining or providing of the substantially solid composition occurs above-surface.

Embodiment 6 provides the method of any one of Embodiments 1-5, wherein the obtaining or providing of the substantially solid composition occurs downhole.

Embodiment 7 provides the method of any one of Embodiments 1-6, wherein the carrier fluid is about 50 wt % to about 90 wt % of the mixture.

Embodiment 8 provides the method of any one of Embodiments 1-7, wherein the carrier fluid comprises at least one of an aqueous fluid, an oxygenated organic fluid, and a hydrocarbon oil.

Embodiment 9 provides the method of any one of Embodiments 1-8, wherein the carrier fluid comprises at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl formamide, diesel, kerosene, mineral oil, a hydrocarbon comprising an internal olefin, a hydrocarbon comprising an alpha olefin, xylenes, an ionic liquid, methyl ethyl ketone, and cyclohexanone.

Embodiment 10 provides the method of any one of Embodiments 1-9, wherein the carrier fluid comprises at least one of water, brine, produced water, flowback water, brackish water, and sea water.

Embodiment 11 provides the method of any one of Embodiments 1-10, wherein the substantially solid composition is substantially a particulate solid in the mixture when placed in the subterranean formation.

Embodiment 12 provides the method of any one of Embodiments 1-11, wherein the mixture is substantially free of dissolved acid.

Embodiment 13 provides the method of any one of Embodiments 1-12, wherein the mixture is substantially free of added mineral acid.

Embodiment 14 provides the method of any one of Embodiments 1-13, further comprising at least partially dissolving the substantially solid composition in the carrier fluid.

Embodiment 15 provides the method of Embodiment 14, wherein an aqueous component of the mixture has a pH of about 0 to about 5.

Embodiment 16 provides the method of any one of Embodiments 14-15, wherein an aqueous component of the mixture has a pH of less than 4.

Embodiment 17 provides the method of any one of Embodiments 14-16, wherein the mixture or an aqueous solution that contacts the mixture has an HF concentration of about 0.01% w/v to about 50% w/v.

Embodiment 18 provides the method of any one of Embodiments 14-17, wherein the mixture or an aqueous solution that contacts the mixture has an HF concentration of greater than about 0.5% w/v.

Embodiment 19 provides the method of any one of Embodiments 14-18, wherein the mixture has a content of at least one of NaBr, $CaCl_2$, $CaBr_2$, $ZnBr_2$, KCl, and NaCl of about 0.1% w/v to about 20% w/v.

Embodiment 20 provides the method of any one of Embodiments 14-19, wherein the mixture has a content of at least one of NaBr, $CaCl_2$, $CaBr_2$, $ZnBr_2$, KCl, and NaCl of greater than about 5% w/v.

Embodiment 21 provides the method of any one of Embodiments 14-20, wherein the at least partial dissolution occurs prior to placing the mixture in the subterranean formation.

Embodiment 22 provides the method of any one of Embodiments 14-21, wherein the substantially solid composition at least partially dissolves at least one of during and after placing in the subterranean formation.

Embodiment 23 provides the method of any one of Embodiments 1-22, wherein the hydrogen fluoride precursor salt is about 0.1 wt % to about 50 wt % of the substantially solid composition.

Embodiment 24 provides the method of any one of Embodiments 1-23, wherein the hydrogen fluoride precursor salt is about 0.5 wt % to about 10 wt % of the substantially solid composition.

Embodiment 25 provides the method of any one of Embodiments 1-24, wherein the hydrogen fluoride precursor salt comprises at least one of a hydrogen fluoride salt or a bifluoride salt.

Embodiment 26 provides the method of any one of Embodiments 1-25, wherein the hydrogen fluoride precursor salt is at least one chosen from a fluoride or bifluoride salt of a substituted or unsubstituted $(C_1-C_{50})$hydrocarbyl having at least one amine or amide functional group thereon, an inorganic fluoride or bifluoride salt, a tetra$((C_1-C_{10})$hydrocarbyl)ammonium fluoride, ammonium fluoride, potassium bifluoride, sodium bifluoride, ammonium bifluoride, an alkali or ammonium tetrafluoroborate salt, an alkali or ammonium hexafluorophosphate salt, and polyvinylpyridinium fluoride, wherein each hydrocarbyl is independently selected.

Embodiment 27 provides the method of any one of Embodiments 1-26, wherein the hydrogen fluoride precursor salt is ammonium bifluoride.

Embodiment 28 provides the method of any one of Embodiments 1-27, wherein the amide hydrochloride salt is about 20 wt % to about 99 wt % of the substantially solid composition.

Embodiment 29 provides the method of any one of Embodiments 1-28, wherein the amide hydrochloride salt is about 60 to about 90 wt % of the substantially solid composition.

Embodiment 30 provides the method of any one of Embodiments 1-29, wherein the amide hydrochloride salt is at least one chosen from a hydrochloride salt of a substituted or unsubstituted $(C_1-C_{50})$hydrocarbyl having at least one amide functional group thereon, a di$(C_1-C_{10})$hydrocarbylformamide hydrochloride, dimethylformamide hydrochloride, acetamide hydrochloride, di$(C_1-C_{10})$hydrocarbylacetamide hydrochloride, dimethylacetamide hydrochloride, carbamimidoylurea hydrochloride, imidourea hydrochloride, and urea hydrochloride, wherein each hydrocarbyl is independently selected.

Embodiment 31 provides the method of any one of Embodiments 1-30, wherein the amide hydrochloride salt is urea hydrochloride.

Embodiment 32 provides the method of any one of Embodiments 1-31, wherein the composition further comprises a chelating agent.

Embodiment 33 provides the method of Embodiment 32, wherein the chelating agent is 5 wt % to about 60 wt % of the substantially solid composition.

Embodiment 34 provides the method of any one of Embodiments 32-33, wherein the chelating agent is about 10 wt % to about 20 wt % of the substantially solid composition.

Embodiment 35 provides the method of any one of Embodiments 32-34, wherein the chelating agent is at least one chosen from an aminopolycarboxylate, a gluconate, an organophosphonate, and a glucoheptonate.

Embodiment 36 provides the method of any one of Embodiments 32-35, wherein the chelating agent is at least one chosen from polyaspartic acid, methylglycine diacetic acid (MGDA), glutamic acid N,N-diacetic acid (GLDA), L-aspartic acid N,N-diacetic acid (ASDA), cysteic acid-N,N-diacetic acid, cysteic acid-N-monoacetic acid, alanine-N-monoacetic acid, N-(3-hydroxysuccinyl)aspartic acid, N-[2-(3-hydroxysuccinyl)]-L-serine, diethanolglycine/2-hydroxyethyliminodiacetic acid (DEG/HEIDA), iminodisuccinic acid (IDS), hydroxyethylene iminodisuccinic acid (HIDS), N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl] amine (TCA6), ethylenediaminedisuccinic acid (EDDS), ethylenediaminetetraacetic acid (EDTA), diethylenetriaminepentaacetic acid (DTPA), hydroxyethylethylenediaminetriacetic acid (HEDTA), 1,3-propylenediaminetetraacetic acid (1,3-PDTA), nitrilotriacetic acid (NTA), gluconic acid, glucoheptonic acid, sodium tripolyphosphate (STPP), trisodium phosphate (TSP), aminotris(methylene phosphonic acid) (ATMP), ethylenediamine tetra(methylene phosphonic acid) (EDTMP), diethylenetriamine penta(triethylene phosphonic acid)) (DTPMP), 1-hydroxy ethylidene-1,1-diphosphonic acid (HEDP), phosphonobutanetricarboxylic acid (PBTC), hexamethylenediamine tetra(methylene phosphonic acid)) (HDTMP), N-(2-acetamido)iminodiacetic acid (ADA), hydroxymethyl-iminodiacetic acid, 2-(2-carboxyethylamino)succinic acid (CEAA), 2-(2-carboxymethylamino)succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, citric acid, tartaric acid, maleic acid, and a salt of any member of the preceding list.

Embodiment 37 provides the method of any one of Embodiments 32-36, wherein the chelating agent is at least one chosen from polyaspartic acid, methylglycine diacetic acid (MGDA), iminodisuccinic acid (IDS), hydroxyethylene iminodisuccinic acid (HIDS), hydroxyethylethylenediaminetriacetic acid (HEDTA), and glutamic acid diacetic acid (GLDA).

Embodiment 38 provides the method of any one of Embodiments 1-37, wherein the mixture further comprises a viscosifier.

Embodiment 39 provides the method of Embodiment 38, wherein the viscosifier comprises at least one of a substituted or unsubstituted polysaccharide, and a substituted or unsubstituted polyalkenylene, wherein the polysaccharide or polyalkenylene is crosslinked or uncrosslinked.

Embodiment 40 provides the method of any one of Embodiments 38-39, wherein the viscosifier comprises a polymer comprising at least one monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide.

Embodiment 41 provides the method of any one of Embodiments 38-40, wherein the viscosifier comprises a crosslinked gel or a crosslinkable gel.

Embodiment 42 provides the method of Embodiment 41, wherein the crosslinked gel is crosslinked prior to addition to the mixture.

Embodiment 43 provides the method of any one of Embodiments 38-42, wherein the viscosifier comprises at least one of a linear polysaccharide, and poly(($C_2$-$C_{10}$)alkenylene), wherein the ($C_2$-$C_{10}$)alkenylene is substituted or unsubstituted.

Embodiment 44 provides the method of any one of Embodiments 38-43, wherein the viscosifier comprises at least one of poly(acrylic acid) or ($C_1$-$C_5$)alkyl esters thereof, poly(methacrylic acid) or ($C_1$-$C_5$)alkyl esters thereof, poly (vinyl acetate), poly(vinyl alcohol), poly(ethylene glycol), poly(vinyl pyrrolidone), polyacrylamide, poly (hydroxyethyl methacrylate), alginate, chitosan, curdlan, dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, welan, derivatized starch, tamarind, tragacanth, guar gum, derivatized guar, hydroxypropyl guar, carboxy methyl guar, carboxymethyl hydroxylpropyl guar, gum ghatti, gum arabic, locust bean gum, derivatized cellulose, carboxymethyl cellulose, hydroxyethyl cellulose, carboxymethyl hydroxyethyl cellulose, hydroxypropyl cellulose, and methyl hydroxyl ethyl cellulose.

Embodiment 45 provides the method of any one of Embodiments 38-44, wherein the viscosifier comprises poly (vinyl alcohol) homopolymer, poly(vinyl alcohol) copolymer, a crosslinked poly(vinyl alcohol) homopolymer, and a crosslinked poly(vinyl alcohol) copolymer.

Embodiment 46 provides the method of any one of Embodiments 1-45, wherein the carrier fluid comprises, or wherein the mixture further comprises, an aqueous or oil-based fluid comprising a stimulation fluid, fracturing fluid, spotting fluid, clean-up fluid, completion fluid, remedial treatment fluid, pill, acidizing fluid, or a combination thereof.

Embodiment 47 provides the method of any one of Embodiments 1-46, wherein the placement of the mixture in the subterranean formation comprises fracturing at least part of the subterranean formation to form at least one subterranean fracture.

Embodiment 48 provides the method of any one of Embodiments 1-47, wherein the mixture further comprises a proppant, a resin-coated proppant, or a combination thereof.

Embodiment 49 provides the method of any one of Embodiments 1-48, wherein at least one of prior to, during, and after the placing of the mixture in the subterranean formation, the composition is used downhole, at least one of alone and in combination with other materials, as a stimulation fluid, fracturing fluid, spotting fluid, clean-up fluid, completion fluid, remedial treatment fluid, pill, acidizing fluid, or a combination thereof.

Embodiment 50 provides a system for performing the method of any one of Embodiments 1-49, the system comprising a tubular disposed in a wellbore; and a pump configured to pump the mixture downhole through the tubular and into the subterranean formation.

Embodiment 51 provides a method of treating a subterranean formation, the method comprising:
obtaining or providing a substantially solid composition comprising
about 0.001 wt % to about 50 wt % ammonium bifluoride;
about 20 wt % to about 99 wt % urea hydrochloride; and
about 5 wt % to about 60 wt % of a chelating agent that is at least one chosen from polyaspartic acid, methylglycine diacetic acid (MGDA), iminodisuccinic acid (IDS), hydroxyethylene iminodisuccinic acid (HIDS), hydroxyethylethylenediaminetriacetic acid (HEDTA), and glutamic acid diacetic acid (GLDA);
combining the composition with a carrier fluid, to form a mixture; and
placing the mixture in a subterranean formation downhole, wherein the combining occurs at least one of before, during, and after placing the mixture in the subterranean formation.

Embodiment 52 provides a system comprising:
a substantially solid composition comprising
a hydrogen fluoride precursor salt; and
an amide hydrochloride salt; and
a subterranean formation comprising the composition therein.

Embodiment 53 provides the system of Embodiment 52, further comprising
a tubular disposed in a wellbore;
a pump configured to pump the composition downhole.

Embodiment 54 provides a composition for treatment of a subterranean formation, the composition comprising:
a hydrogen fluoride precursor salt; and
an amide hydrochloride salt;
wherein the composition is substantially solid.

Embodiment 55 provides a mixture comprising the composition of Embodiment 54, wherein the mixture comprises at least one of a carrier fluid and a downhole fluid.

Embodiment 56 provides the composition of any one of Embodiments 54-55, wherein the composition is a composition for acidizing a subterranean formation.

Embodiment 57 provides a composition for treatment of a subterranean formation, the composition comprising:
about 0.001 wt % to about 50 wt % ammonium bifluoride;
about 20 wt % to about 99 wt % urea hydrochloride; and about 5 wt % to about 60 wt % of a chelating agent that is at least one chosen from polyaspartic acid, methylglycine diacetic acid (MGDA), iminodisuccinic acid (IDS), hydroxyethylene iminodisuccinic acid (HIDS), hydroxyethylethylenediaminetriacetic acid (HEDTA), and glutamic acid diacetic acid (GLDA);
wherein the composition is substantially solid.

Embodiment 58 provides a method of preparing a composition for treatment of a subterranean formation, the method comprising:
forming a substantially solid composition comprising
a hydrogen fluoride precursor salt; and
an amide hydrochloride salt.

Embodiment 59 provides the composition, apparatus, method, or system of any one or any combination of Embodiments 1-58 optionally configured such that all elements or options recited are available to use or select from.

What is claimed is:

1. A method of treating a subterranean formation; the method comprising:
    obtaining or providing a solid composition comprising
        0.001 wt % to about 50 wt %, based on the total weight of the solid composition, of a hydrogen fluoride precursor salt; and
        about 20 wt % to about 99 wt %, based on the total weight of the solid composition, of an amide hydrochloride salt;
    combining the solid composition with a non-aqueous carrier fluid comprising at least one of an oxygenated organic fluid and a hydrocarbon oil, to form a suspension or slurry of the solid composition in the carrier fluid; and
    placing the suspension or slurry of the substantially solid composition in a subterranean formation downhole, wherein the solid composition is a particulate solid when placed in the subterranean formation, whereby the solid composition has diverting properties.

2. The method of claim 1, wherein the subterranean formation comprises at least one of a sandstone formation and a shale formation.

3. The method of claim 1, wherein the carrier fluid is about 50 wt % to about 90 wt % of the mixture.

4. The method of claim 1, wherein the mixture has a content of at least one of NaBr, $CaCl_2$, $CaBr_2$, $ZnBr_2$, KCl, and NaCl of about 0.1% w/v to about 20% w/v.

5. The method of claim 1, wherein the hydrogen fluoride precursor salt is about 0.1 wt % to about 40 wt % of the solid composition.

6. The method of claim 1, wherein the hydrogen fluoride precursor salt comprises at least one of a hydrogen fluoride salt or a bifluoride salt.

7. The method of claim 1, wherein the hydrogen fluoride precursor salt is at least one chosen from a fluoride or bifluoride salt of a substituted or unsubstituted ($C_1$-$C_{50}$) hydrocarbyl having at least one amine or amide functional group thereon, an inorganic fluoride or bifluoride salt, a tetra(($C_1$-$C_{10}$)hydrocarbyl)ammonium fluoride, ammonium fluoride, potassium bifluoride, sodium bifluoride, ammonium bifluoride, an alkali or ammonium tetrafluoroborate salt, an alkali or ammonium hexafluorophosphate salt, and polyvinylpyridinium fluoride, wherein each hydrocarbyl is independently selected.

8. The method of claim 1, wherein the amide hydrochloride salt is at least one chosen from a hydrochloride salt of a substituted or unsubstituted ($C_1$-$C_{50}$)hydrocarbyl having at least One amide functional group thereon, a di($C_1$-$C_{10}$) hydrocarbylformamide hydrochloride, dimethylformamide hydrochloride, acetamide hydrochloride, di($C_1$-$C_{10}$)hydrocarbylacetamide hydrochloride, dimethylacetamide hydrochloride, carbamimidoylurea hydrochloride, imidourea hydrochloride, and urea hydrochloride, wherein each hydrocarbyl is independently selected.

9. The method of claim 1, wherein the composition further comprises a chelating agent.

10. The method of claim 9, wherein (a) the amide hydrochloride salt is about 20 wt % to about 94.999 wt % and (b) the chelating agent is 5 wt % to about 60 wt %, of the substantially solid composition.

11. The method of claim 9, wherein the chelating agent is at least one chosen from an aminopolycarboxylate, a gluconate, an organophosphonate, and a glucoheptonate.

12. The method of claim 9, wherein the chelating agent is at least one chosen from polyaspartic acid, methylglycine diacetic acid (MGDA), glutamic acid N,N-diacetic acid (GLDA), L-aspartic acid N,N-diacetic acid (ASDA), cysteic acid-N,N-diacetic acid, cysteic acid-N-monoacetic acid, alanine-N-monoacetic acid, N-(3-hydroxysuccinyl)aspartic acid, N-[2-(3-hydroxysuccinyl)]-L-serine, diethanol/2-hydroxyethyliminodiacetic acid (DEG/HEIDA), iminodisuccinic acid (IDS), hydroxyethylene iminodisuccinic acid (HIDS), N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), ethylenediaminedisuccinic acid (EDDS), ethylenediaminetetraacetic acid (EDTA), diethylenetriaminepentaacetic acid (DTPA), hydroxyethylethylenediaminetriacetic acid (HEDTA), 1,3-propylenediaminetetraacetic acid (1,3-PDTA), nitrilotriacetic acid (NTA), gluconic acid, glucoheptonic acid, sodium tripolyphosphate (STPP), trisodium phosphate (TSP), aminotris(methylene phosphonic acid) (ATMP), ethylenediamine tetra(methylene phosphonic acid) (EDTMP), diethylenetriamine penta(triethylene phosphonic acid) (DTPMP), 1-hydroxy ethylidene-1,1-diphosphonic acid (HEDP), phosphonobutanetricarboxylic acid (PBTC), hexamethylenediamine tetra(methylene phosphonic acid) (HDTMP), N-(2-acetamido)iminodiacetic acid (ADA), hydroxymethyl-iminodiacetic acid, 2-(2-carboxyethylamino)succinic acid (CEAA), 2-(2-carboxymethylamino) succinic acid (CMAA), diethylenetriamine-N,N"-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N-disuccinic acid, 1,2-propylenediamine-N,N'-disuccinic acid, 1,3-propylenediamine-N,N'-disuccinic acid, cis-cyclohexanediamine-N,N-disuccinic acid, trans-cyclohexanediamine-N,N'-disuccinic acid, ethylenebis(oxyethylenenitrilo)-N,N'-disuccinic acid, citric acid, tartaric acid, maleic acid, and a salt of any member of the preceding list.

13. A method of treating a subterranean formation, the method comprising:
    obtaining or providing a solid composition comprising
        (i) about 0.001 wt % to about 50 wt % ammonium bifluoride;
        (ii) about 20 wt % to about 94.999 wt % urea hydrochloride; and
        (iii) about 5 wt % to about 60 wt % of a chelating agent, wherein the chelating agent is chosen from polyaspartic acid, methylglycine diacetic acid (MGDA), iminodisuccinic acid (IDS), hydroxyethylene iminodisuccinic acid (HIDS), hydroxyethylethylenediaminetriacetic acid (HEDTA), and glutamic acid diacetic acid (GLDA);

combining the composition with a non-aqueous carrier fluid comprising at least one of an oxygenated organic fluid and a hydrocarbon oil, to form a suspension or slurry of the solid composition in the carrier fluid; and placing the suspension or slurry of the solid composition in a subterranean formation downhole, wherein the solid composition is a particulate solid when placed in the subterranean formation, whereby the solid composition has diverting properties, wherein the combining occurs at least one of before, during, and after placing the mixture in the subterranean formation.

14. The method of claim 1, further comprising:

adjusting the composition of the mixture based upon the rate and amount of treatment occurring at a location downhole.

* * * * *